United States Patent
Yang et al.

(10) Patent No.: US 11,921,404 B2
(45) Date of Patent: Mar. 5, 2024

(54) INTELLIGENT LONG-DISTANCE INFRARED FILL-LIGHT SET

(71) Applicant: Chih-Yi Yang, Taipei (TW)

(72) Inventors: Chih-Yi Yang, Taipei (TW); Hironori Kondo, Taipei (TW)

(73) Assignee: LUMOS TECHNOLOGY CO., LTD., Taipei (TW)

(*) Notice: Subject to any disclaimer, the term of this patent is extended or adjusted under 35 U.S.C. 154(b) by 84 days.

(21) Appl. No.: 17/791,171

(22) PCT Filed: Jan. 14, 2021

(86) PCT No.: PCT/CN2021/071938
§ 371 (c)(1),
(2) Date: Jul. 6, 2022

(87) PCT Pub. No.: WO2021/143787
PCT Pub. Date: Jul. 22, 2021

(65) Prior Publication Data
US 2023/0050340 A1 Feb. 16, 2023

Related U.S. Application Data

(60) Provisional application No. 62/961,223, filed on Jan. 15, 2020.

(51) Int. Cl.
*G03B 15/05* (2021.01)
*H04N 23/71* (2023.01)
*H04N 23/74* (2023.01)

(52) U.S. Cl.
CPC ............ *G03B 15/05* (2013.01); *H04N 23/71* (2023.01); *H04N 23/74* (2023.01)

(58) Field of Classification Search
CPC ............ G03B 15/05; G03B 2215/0539; G03B 15/02; G03B 17/565; G03B 2215/0567;
(Continued)

(56) References Cited

U.S. PATENT DOCUMENTS

| | | | |
|---|---|---|---|
| 2011/0199482 A1* | 8/2011 | Morgan | H04N 5/23299 348/143 |
| 2012/0268607 A1* | 10/2012 | Numazaki | H04N 23/74 348/E5.09 |
| 2019/0328318 A1* | 10/2019 | Wood | A61B 5/0064 |

FOREIGN PATENT DOCUMENTS

| | | | | |
|---|---|---|---|---|
| CA | 2516070 C | * | 5/2012 | ............ G01S 17/023 |
| CN | 104317142 A | * | 1/2015 | ............ F21V 23/0464 |

(Continued)

*Primary Examiner* — Masum Billah
(74) *Attorney, Agent, or Firm* — Che-Yang Chen; Law Office of Michael Chen (57) ABSTRACT

A intelligent long-distance infrared fill-light set for illuminating a predetermined target range at least 500 meters away cooperates with an infrared image-acquisition equipment to obtain an image of an illuminated-object, and includes: infrared fill-lights each including an optical lens, optical axis passing through a focus, infrared light sources emitting an infrared beam having a main beam angle, to generate a substantial overlapping area and at least one non-overlapping area when illuminating to the predetermined target range; enabling devices that enable light sources; and a control unit receiving image data acquired by the infrared image-acquisition equipment, for calculating and adjusting the enabling device to locally strengthen or weaken the substantial overlapping area and/or non-overlapping area. Infrared fill-lights are spaced a predetermined distance, so that the human eyes accidentally entering a predetermined dangerous illumination range will not be simultaneously illuminated by infrared beams, thereby avoiding exceeding a Maximum Permissible Exposure (MPE).

6 Claims, 8 Drawing Sheets

(58) Field of Classification Search
CPC ............ G03B 2215/0575; G03B 15/04; G03B 17/12; G03B 17/561
USPC ........................................................ 348/164
See application file for complete search history.

(56) References Cited

FOREIGN PATENT DOCUMENTS

| | | | |
|---|---|---|---|
| CN | 204832739 U | * | 12/2015 |
| CN | 206162029 U | * | 5/2017 |
| CN | 108200232 A | * | 6/2018 |
| CN | 113747012 B | * | 3/2023 |

* cited by examiner

INTELLIGENT LONG-DISTANCE INFRARED FILL-LIGHT SET

FIELD OF THE INVENTION

Embodiments of the present disclosure relate to a long-distance infrared laser illumination device, and more particularly to an intelligent illumination equipment that achieves both short-distance human eyes protection and long-distance illumination.

BACKGROUND OF THE INVENTION

Since the intensity of light irradiation decreases inversely with the square of the distance, once long-distance illumination observation is needed, relatively strong luminous intensity and narrow divergence angle are required, take laser for an example. A risk resulted from a too narrow illuminating angle is that once a person enters the illuminated area, if the eyes (especially the pupils) are illuminated by beams with large energy, the person's vision could be damaged. In cases such as border smuggling, although the infrared light sources might be used to assist monitoring without being noticed by the suspects, operators or staffs nearby could also be unaware due to the emitting wavelength of the light sources being beyond human visible spectrum, endangering the operators or people straying too close.

In terms of monitoring technology, due to the gradual advancement of cameras, not only can image resolution be greatly improved, and illuminating distance be increased, the focal length can also be altered by lens arrangement, so that some zoom lens can even cover both wide-angle at close-range and telephoto views faraway. Such camera can function well in the daytime or at night when there are sufficient artificial light sources around the illuminated-object. Nevertheless, even the best camera have no use in total darkness at night.

Existing illuminating devices to go with cameras on the market such as outdoor surveillance cameras with accompanying light sources can solve the above problems within a few hundred meters. If the distance is increased, for example, to more than a half-kilometer or even a kilometer or two, the luminance of a common light source often diverges inversely to the square of the distance, especially considering the diffusion and absorption caused by the air and impurity molecules encountered on the optical path, making the common light sources unable to assist shooting images.

According to the definition made by the International Commission on Illumination (CIE), the beam angle refers to the "angle between two imaginary lines in a plane through the optical beam axis, such that these lines pass through the center of the front face of the device and through points at which the luminous intensity is 50% of the centre beam intensity luminous intensity." The greater the beam angle, the smaller the central luminous intensity, and the larger the area of illumination; conversely, the smaller the beam angle is, the more concentrative the beam becomes. To solve illumination issues of the illuminated-object at the kilometer level, a light source with higher collimation is required, e.g. laser. Due to the high coherence of laser in both space and time, the beam angle of the emitted beam is extremely narrow, its wavelength remains fairly unchanged, and the phase of the emitted beam is completely identical within a certain time period. Through actual measurement, even after a half-kilometer optical path, after the aforementioned diffusion and absorption, the beam angle of this type of light sources can still be limited to within a solid angle of around 15 degrees, and the energy is concentrated in a very small area of illumination, which meets the preliminary need for assistance in illuminating during monitoring. The recently greatly improved solid-state light sources are very suitable for this type of application. Taking the Vertical Cavity Surface Emitting laser (VCSEL) as example, with its narrow beam angle characteristics and sufficient energy output combined, a narrow beam angle illumination device can be achieved by cooperating with a set of focus-adjustable lens.

In order to protect human health, the International Safety Standards Organization defines the Maximum Allowable Exposure (MPE) to regulate some high-power light sources that may cause harm to human bodies. Since the eyes are sensitive to light, the corresponding MPE value is even stricter. Besides, for detecting the aforementioned smuggling, once there's someone among a group of stowaways dressing in high infrared-reflective clothes, they may also cause the reflection of a large amount of infrared light, making the camera immediately saturate, resulting in the inability to detect and count other stowaways among the group. Therefore, how to overcome the safety problem while taking into account the long-distance illumination functions, and how to differentially increase or decrease the luminous intensity of smaller illuminated areas within the large range therein are both problems to be solved by the present disclosure.

SUMMARY OF THE INVENTION

To address the above deficiencies, embodiments of the present disclosure provide an intelligent long-distance infrared fill-light set, so as to: (1) distribute the burden of the energy output to a plurality of infrared laser light sources, so that the MPE value will not be exceeded when the human body is illuminated in a close distance, achieving the protection of human eyes and the long-distance light filling and auxiliary monitoring. (2) assist the detection of the target location of a live animal without exposing the existence of the device (3) via having at least one portion of light sources arranged to be off-axis, generate an overlapping area and a non-overlapping area when illuminating the predetermined target range, in order to control the illumination intensity of each small area; and utilize the stealthy infrared light to protect the monitoring from being easily detected.

To achieve the above objectives, the present disclosure discloses an intelligent long-distance infrared fill-light set for illuminating a predetermined target range of at least 500 meters, wherein the intelligent long-distance infrared fill-light set cooperates with an infrared image acquisition equipment to obtain at least one image of illuminated-object within the predetermined target range, and the intelligent long-distance infrared fill-light set comprises a plurality of infrared fill-lights, a plurality of coherent infrared light sources, a plurality of enabling devices and a control unit. The plurality of infrared fill-lights respectively comprises at least one optical lens having an optical axis that passes through a focus. The plurality of coherent infrared light sources is used for respectively emitting at least one infrared coherent beam, wherein each of the infrared coherent beam respectively has a main beam angle, making the infrared coherent beam generate a substantial overlapping area and at least one non-overlapping area when illuminating the predetermined target range; and the main beam angle of at least one of the coherent infrared light sources deviates from the optical axis. The plurality of enabling devices are used for outputting enabling current in order to respectively enable the coherent infrared light sources that emits the infrared coherent beam. The control unit that receives image data acquired by the infrared image acquisition equipment, for calculating and respectively adjusting the enabling current of the enabling device according to brightness of the image of the illuminated-object in the image data so as to respectively control luminous intensity of the coherent infrared light source, for locally strengthen or weaken the substantial overlapping area and/or the non-overlapping area in the predetermined target range. Any two infrared fill-lights are spaced at least a predetermined distance, so that within a predetermined dangerous illumination range, human eyes that accidentally enters into the predetermined dangerous illumination range will not be simultaneously illuminated by a plurality of infrared coherent beams from the infrared fill-lights, thereby avoiding exceeding a Maximum Permissible Exposure (MPE).

In order to meet both the contradictory requirements of having a high-power laser for long-distance illumination while remaining harmless to human eyes within a close distance, the present disclosure uses multiple light sources to share the required energy output, such that individual light sources does not exceed the MPE value when illuminating the human body in a close distance; furthermore, the distance between adjacent light sources is arranged in the set with avoiding more than one narrow angle beams from simultaneously entering someone's eyes in a close distance taken into consideration. Therefore, the design of the present disclosure can meet both the requirements of luminous intensity and safety.

In addition, the present disclosure further includes intelligent lighting functions. Generally speaking, illumination device designs mostly focus on the illumination uniformity of the illuminated area, but if the illuminated area a mix of highly reflective objects, partially reflective objects and low-reflective objects, a uniform light source often makes the highly reflective objects overexposed due to reflections while causing the low-reflective objects underexposed, so that neither of the reflective objects can give clear and detailed image data to be analyzed. The term "intelligent" in the present disclosure refers to a central control computer that fine-tunes the luminous intensity of individual light sources, thereby making corresponding illumination corrections according to the severity of the reflectivity of the illuminated-object, so as to solve this type of issues and improve the image details.

In each light box, if the light source behind the lens is set right at the center of the optical axis, the light will be projected onto the target plane where the illuminated-object is located with the central axis as the center. If the arrangement of the light source is deviated from the center within the effective area of the lens, a portion of the beams will be non-overlapping. By using this characteristic, when there's a plurality of light sources in the set, the luminous intensity of each light source can be individually adjusted to determine the illumination intensity of each small area in the illuminated field. This way, with the central control computer analyzing the image obtained by the camera, the output of each light source can be adjusted smoothly, so that highly reflective illuminated-object will not be problematically overexposed in the image, and the low-reflective illuminated-object will not be underexposed due to receiving sufficient auxiliary illumination. Therefore, compared with a uniform light source with only high/low brightness changes, the intelligent light source of the present disclosure has better performance With such feedback operation herein (where synchronization is not necessarily required), the fill-light set can respond to the differences in reflectance of the objects in the illuminated area to effectively supplement the illuminated-object with appropriate auxiliary illumination, allowing the camera to obtain images with higher resolution.

DETAILED DESCRIPTION OF THE EMBODIMENTS

Regarding the aforementioned or other technical contents, features and effects of the present disclosure, they will be clearly understood by referring to the following preferred embodiments and the corresponding drawings thereof. In addition, identical elements might be assigned with similar reference numerals.

Please refer to FIG. 1-6 for an intelligent long-distance infrared fill-light set provided according to the first preferred embodiment of the present disclosure, which shows an array composed of a plurality of infrared fill-lights, an infrared image acquisition equipment 6 that cooperates with the infrared fill-lights, a control unit 4 that is electrically connected to the intelligent long-distance infrared fill-light set and the infrared image acquisition equipment 6, and a storage unit 7 that is electrically connected to the infrared image acquisition equipment 6 and the control unit 4. The infrared image acquisition equipment 6 is referred to herein as a camera. For the convenience of description, a close distance 50 about several meters is defined herein to illustrate the safety design of the present disclosure when applied in the close distance 50.

In this embodiment, the setup of each infrared fill-light is arranged in a light box 1 with an optical lens 11, particularly three infrared laser solid state light-emitting elements (hereinafter referred to as coherent infrared light sources 2) therein with space in between, wherein an enabling device 3 outputs independently adjusted enabling currents to the coherent infrared light sources 2 respectively, thereby independently enabling each coherent infrared light source 2 to emit an infrared coherent beam 21, and controlling the luminous intensity of each light-emitting element. The optical lens 11 has an optical axis 111 passing through its focus 112.

Figure 3:
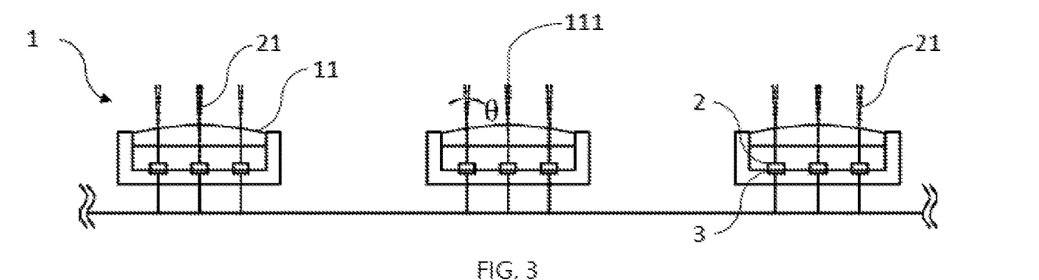
FIG. 3 is a diagram illustrating the top view of the intelligent long-distance infrared fill-light according to the first preferred embodiment of the present disclosure.

As shown in FIG. 3, the coherent infrared light sources 2 are respectively arranged inside the light box 1, and the light-emitting surface thereof respectively face the optical lens 11, wherein one of the coherent infrared light sources 2 coincides with the optical axis 111, while the other two coherent infrared light sources 2 are arranged on opposite sides of the optical axis 111. Therefore in conjunction with FIG. 6, each fill-light emits three infrared coherent beams 21 through the optical lens 11 towards a predetermined target range 51 located at least 500 meters away, wherein each of the infrared coherent beams 21 has a main beam angle θ. Since the coherent infrared light sources 2 are laser light sources, the divergence angle of the laser may be viewed as the main beam angle θ. Also, since both off-centered coherent infrared light sources 2 are set deviating from the optical axis 111, throughout the optical path of the diverging beams, the beams also deviate from the optical axis 111 in an almost symmetrical manner.

Figure 1:
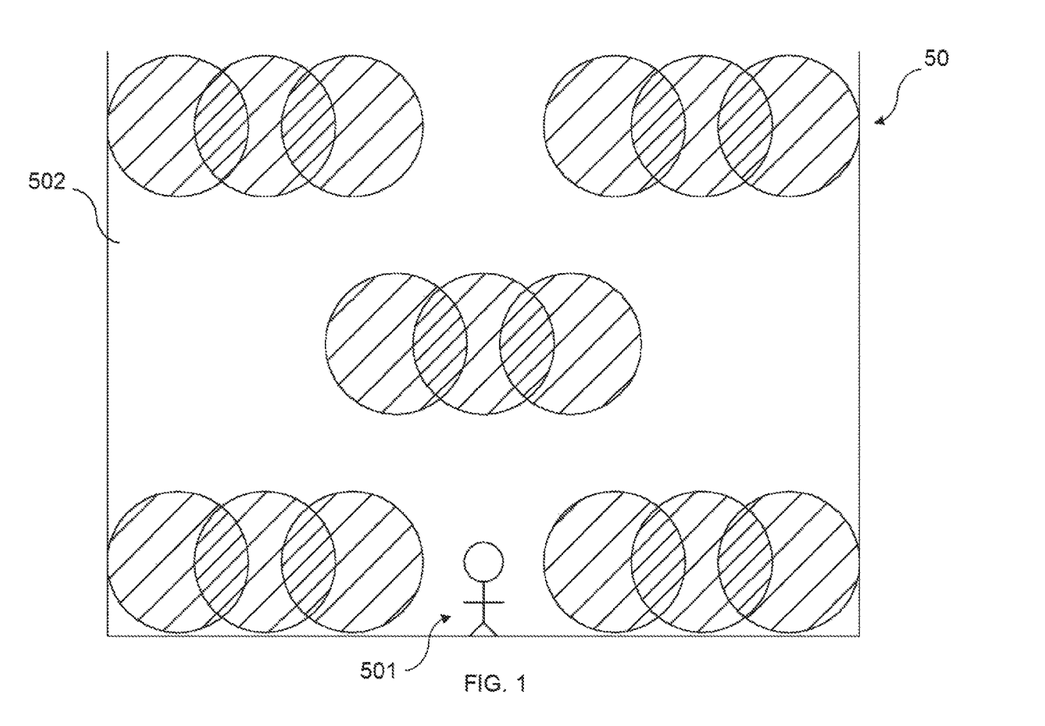
FIG. 1 is a diagram illustrating the cross-sectional view of the beam distribution when illuminating in a close distance according to a first preferred embodiment of the present disclosure.
Figure 2:
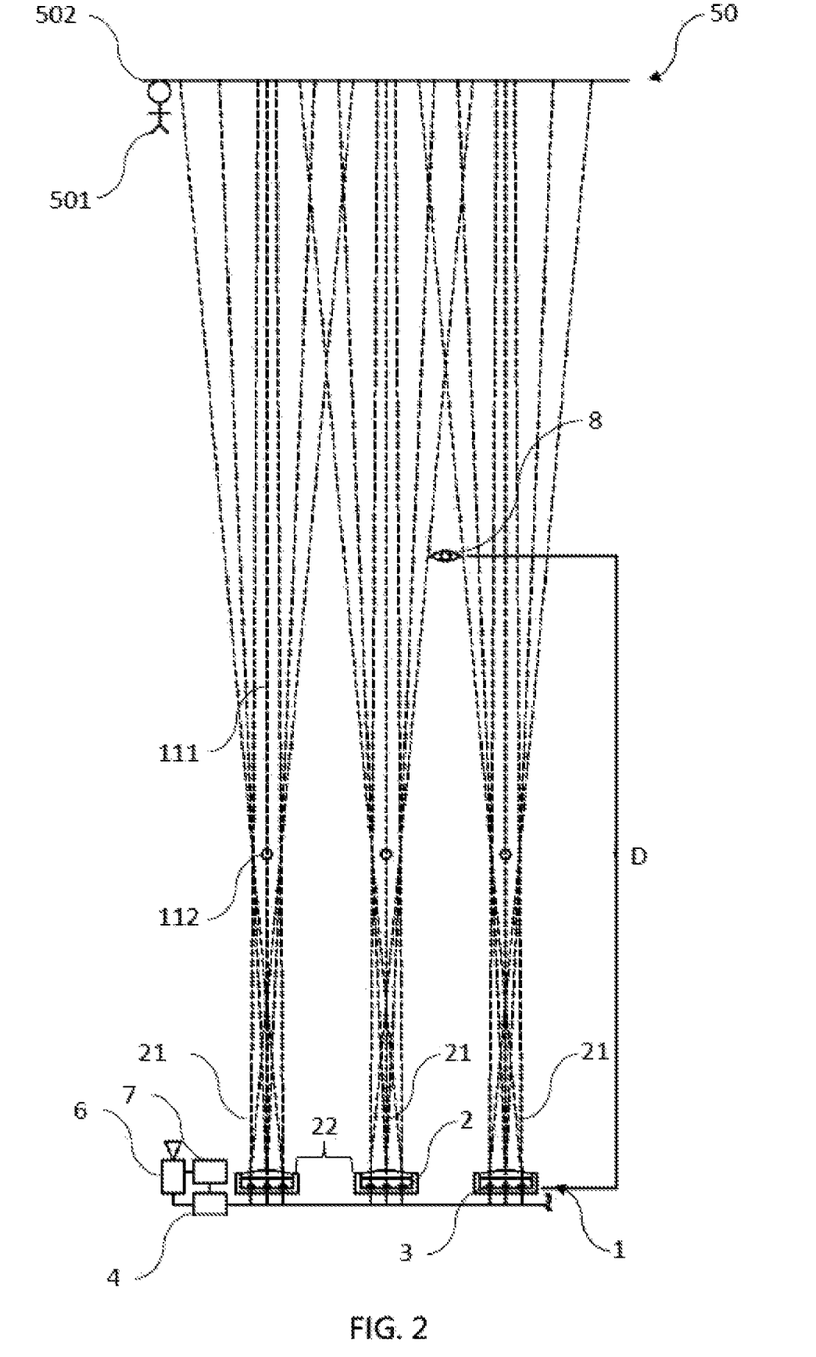
FIG. 2 is a diagram illustrating the top view of the beam distribution when being illuminated in a close distance according to the first preferred embodiment of the present disclosure.
Figure 4:
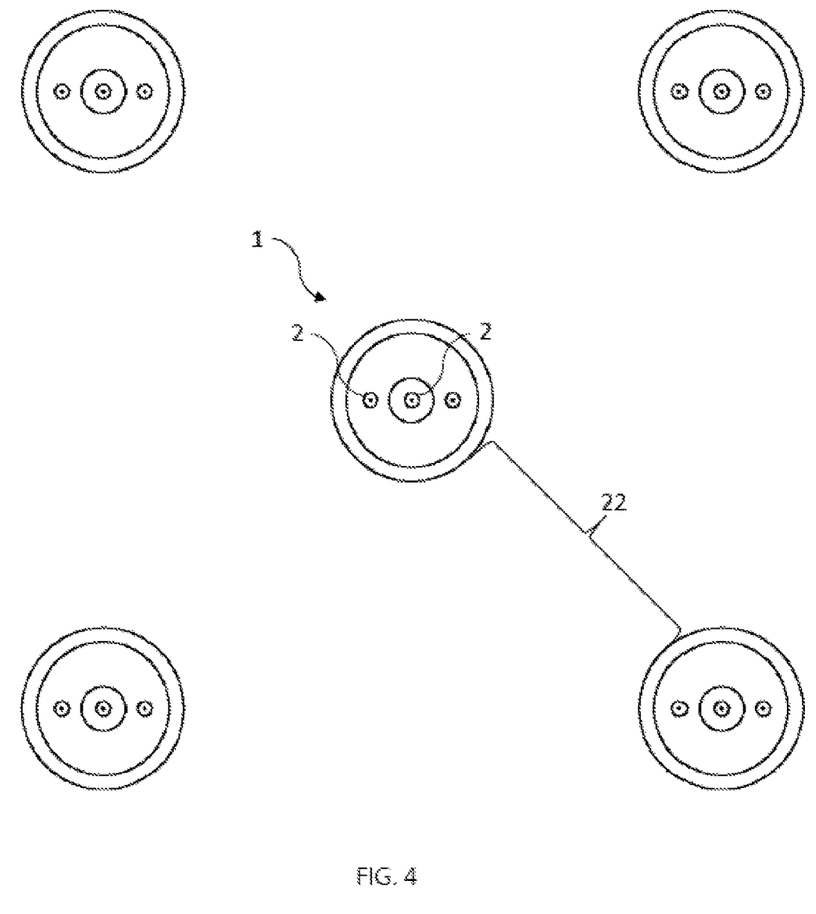
FIG. 4 is a diagram illustrating the front view of the intelligent long-distance infrared fill-light according to the first preferred embodiment of the present disclosure.

Since the three light-emitting elements are arranged with one in the center and the other two on both sides, during the gradual divergence of the emitted beams, there are still overlapped parts of illuminated areas, as shown in FIGS. 1, 2 and 4. For example, when a set of coastal defense searchlight are composed of five fill-lights arranged in a staggered array, and the spacing 22 between each two adjacent fill-lights is at least several centimeters long. Hence, at the close distance 50 one meter away from the fill-lights, the three infrared beams of each fill-light intersect with each other, but the beams emitted by adjacent fill-lights remain far apart, thus forming the light field shown in FIG. 1 on the plane 502 of the illuminated-object where the illuminated-object 501 is located. A predetermined dangerous illumination range D can be defined here out of safety factors, since infrared light is invisible, ordinary people cannot actively detect the beams and then avoid them, there is a need for the following design: Even if there is an unwitting illuminated-object 501 (e.g. a pedestrian or an operator) passing in front of the optical lens 11 of the search light within the predetermined dangerous illumination range D, and the human eye 8 just happens to be illuminated by the infrared coherent beam 21, it will not receive laser emission exceeding the maximum allowable exposure (MPE).

In an environment lacking sufficient light, the pupil of the human eye 8 can expand to approximately 8 mm in diameter. Since the total energy density of all the individual infrared fill-light beams in the present disclosure is still less than the MPE, as long as it stays within the predetermined dangerous illumination range D, the human eye 8 will not be simultaneously illuminated by both two adjacent infrared fill-light main beams overlapping each other. That is, the area where the three beams of one fill-light intersect does not overlap with the area where the three beams of another fill-light intersect, making the combined energy density of the beams in the predetermined dangerous illumination range D still lower than the MPE. Those skilled in the art can easily understand that with the dissipation of the beam, the energy density of the beam attenuates inversely with the square of the distance. Therefore, outside the predetermined dangerous illumination range D, there is no longer any need to worry about overlapping laser beams exceeding the MPE entering through the pupil and causing scorching damage.

That is, basing on the design in the present disclosure, though within the predetermined dangerous illumination range D, the human eye 8 does not get illuminated with energy higher than the MPE, and beyond the dangerous illumination range D, even if the infrared coherent beams 21 keep moving towards the predetermined target range 51 and some illuminated areas gradually overlap, since the infrared coherent beams 21 diverge with the increasing distance, the energy density also drops drastically. Hence, even with overlapping considered, passersby will not receive laser exposure exceeding the MPE.

Figure 5:
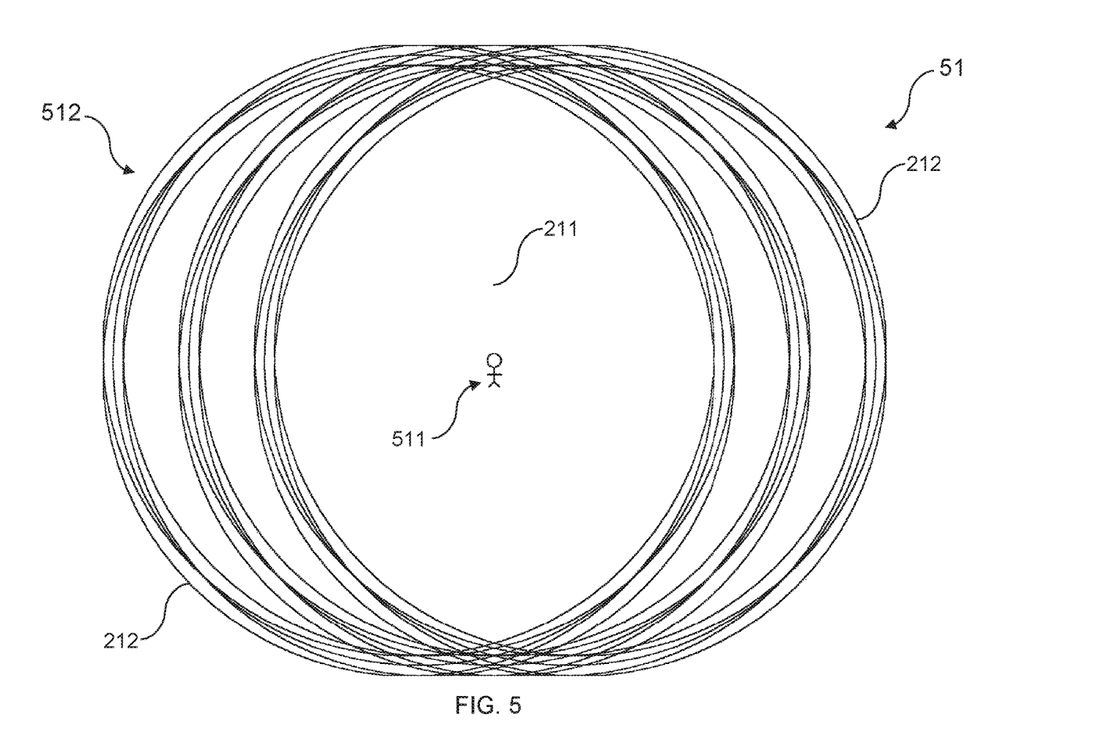
FIG. 5 is a diagram illustrating the cross-sectional view of the beam distribution in a long-distance predetermined target range according to the first preferred embodiment of the present disclosure.
Figure 6:
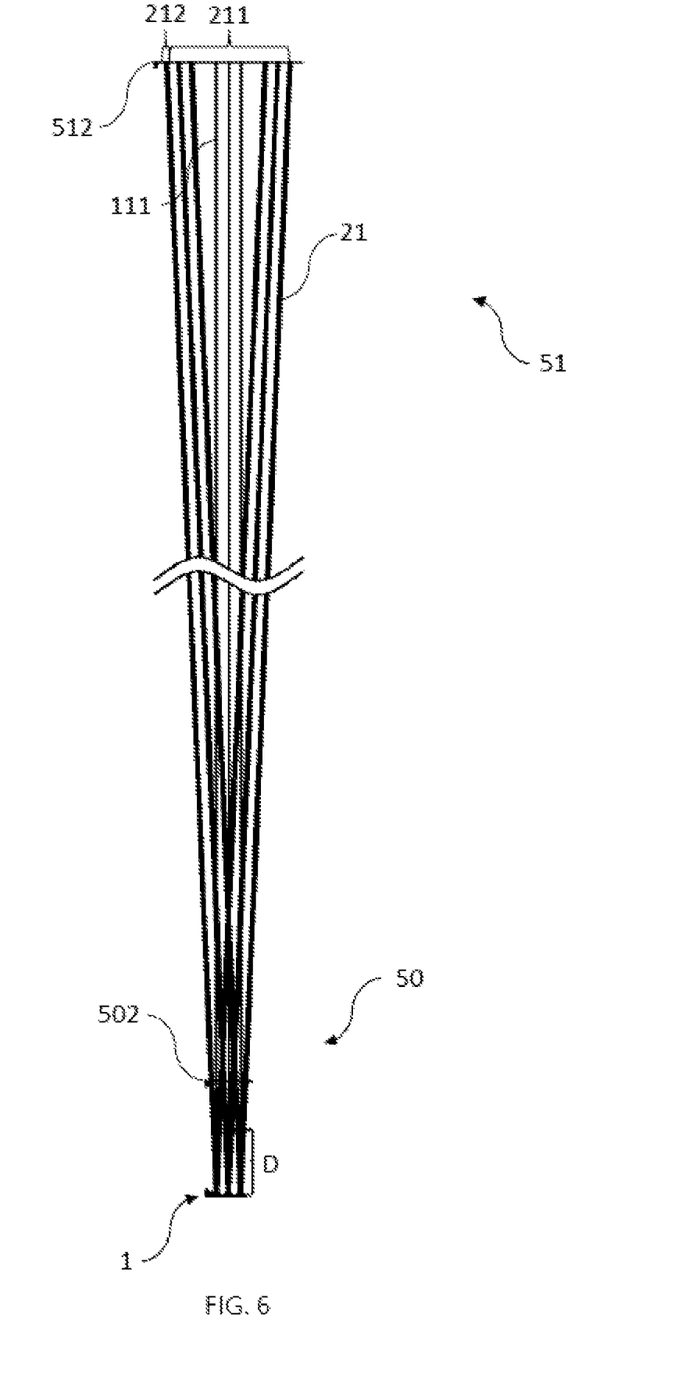
FIG. 6 is a diagram illustrating the top view of the beam distribution when being illuminated from a long-distance according to the first preferred embodiment of the present disclosure.

A substantial overlapping area 211 and non-overlapping areas 212 will be generated when the infrared coherent beam 21 reaches the predetermined target range 51, as shown in FIGS. 5 and 6. For the convenience of description, please refer also to FIG. 4, wherein the three beams from different fill-lights are referred to as the left beams, the central beams and the right beam, respectively. Because the optical axes 111 of each fill-light are parallel to each other, the left beams of each fill-light illuminating over 2500 meters may only be a couple of centimeters apart, but the illuminated area after the divergence may reach an area of hundreds of meters in diameter, that is, the overlap among the left beams, the overlap among the central beams and the overlap among the right beams are all very high, but the non-overlapping between each left beam and its corresponding central beam, and the non-overlapping between each central beam and its corresponding right beam is larger. Hence, even if the predetermined target range is too far, making the luminance insufficient therein, the number of fill-lights may be increased to solve the problem. Conversely, each fill-light itself does not emit light with excessive luminous intensity, thus avoiding harming people who accidentally enter the illuminated area. When the beams emitted by the fill-lights arrive at the predetermined target range 51 after a long optical path, the energy density of the infrared coherent beams 21 have already fallen much lower than the MPE, thus the combined energy can still meet the safety requirement.

For the convenience of illustration, assume that an illuminated-object 511 (e.g. a stowaway) is moving along the plane 512 of the illuminated-object (e.g. a rock wall, hereinafter the illuminated-plane 512), where part of the illuminated-object 511 enters the non-overlapping area 212 on the left, so that the infrared image acquisition equipment 6 obtains the image data of the illuminated-object 511, wherein part of the illuminated-object 511 presents lower brightness in the image data. Meanwhile, the control unit 4 receives the image data obtained by the infrared image acquisition equipment 6, and can thereby command the enabling device 3 corresponding to the non-overlapping area 212 on the left to increase the luminous intensity of the coherent infrared light source 2, and simultaneously command the enabling device 3 corresponding to the non-overlapping area 212 on the right to lower the luminous intensity of the coherent infrared light source 2. This way, the luminance of the non-overlapping area 212 on the left will increase and the luminance of the non-overlapping area 212 on the right will decrease, while the luminance of the substantial overlapping area 211 increases or decreases according to the difference of the luminance changes between the two coherent infrared light sources 2. Hence, in the image data acquired by the infrared image acquisition equipment 6, the clarity level of the illuminated-object 511 is improved due to receiving more illumination, while the reflected luminance of the illuminated-plane 512 decreases due to less illumination. Therefore, if the object to be illuminated (such as the illuminated-object 511) is highly reflective, then it will not be overexposed in the image data, while a low-reflective illuminated-object 511 can get sufficient light and will not be underexposed.

Similarly, assume that the illuminated-object 511 goes on moving along the illuminated-plane 512 to enter the substantial overlapping area 211, the control unit 4 may refer to the image data acquired by the infrared image acquisition equipment 6 to perform corresponding adjustments to the luminous intensity of the coherent infrared light source 2 via the enabling device 3, thus locally strengthen or weaken the substantial overlapping area 211 and/or the non-overlapping area 212 in the predetermined target range 51, in order to correct the part of the image data that lacks brightness or is overexposed so as to improve the image details. In another example, assume the illuminated-object 511 is a vehicle (rather than a pedestrian) that has a highly reflective metal bodyshell carrying one or more passengers, the control unit 4 can also refer to the image data obtained by the infrared image acquisition equipment 6 to locally enhance illumination on the passengers, meanwhile alleviating the overexposure problem in the image data caused by the reflection off the vehicle bodyshell, so that high-resolution images can also be clearly captured in a dark night.

As shown in FIG. 5 and FIG. 6, when the illuminated-object 511 is located at the predetermined target range 51 much farther than 500 meters, although the infrared coherent beam 21 has long since weakened due to dissipation, the array formed by a plurality of the infrared fill-light just happens to make a large portion of the infrared coherent beams 21 from the individual infrared fill-lights all overlap, and even approximately coincides with each other near the optical axis 111. The overlapping area 211 and non-overlapping area 212 formed herein can thus provide sufficient luminance, such that even when the illuminated-plane 512 is located far away, by using the method in the present disclosure, the illuminated-object 511 can be safely and effectively provided with intelligent illumination without using an excessively high-power light source.

Figure 7:
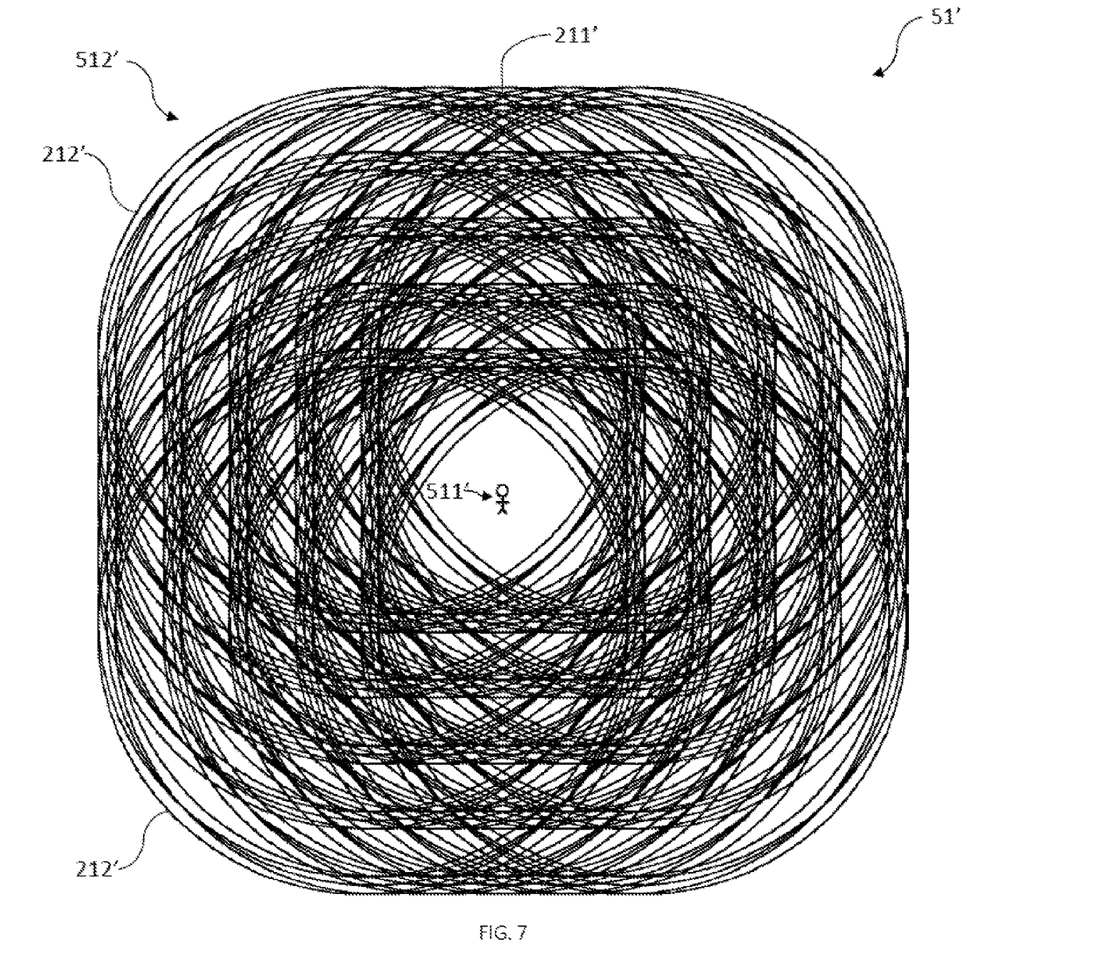
FIG. 7 is a diagram illustrating the cross-sectional view of the beam distribution in a long-distance predetermined target range according to a second preferred embodiment of the present disclosure.
Figure 8:
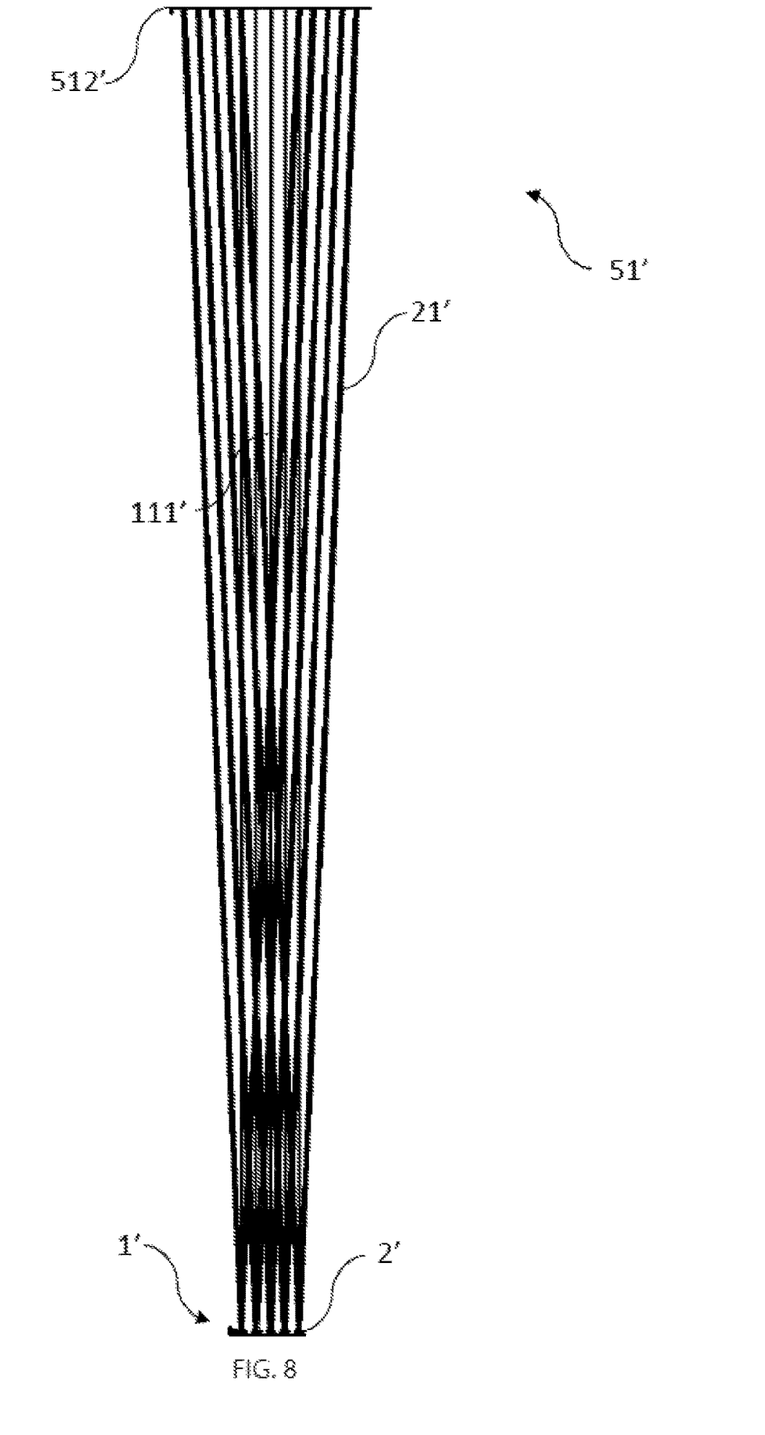
FIG. 8 is a diagram illustrating the top view of the beam distribution in a long-distance predetermined target range according to the second preferred embodiment of the present disclosure.
Figure 9:
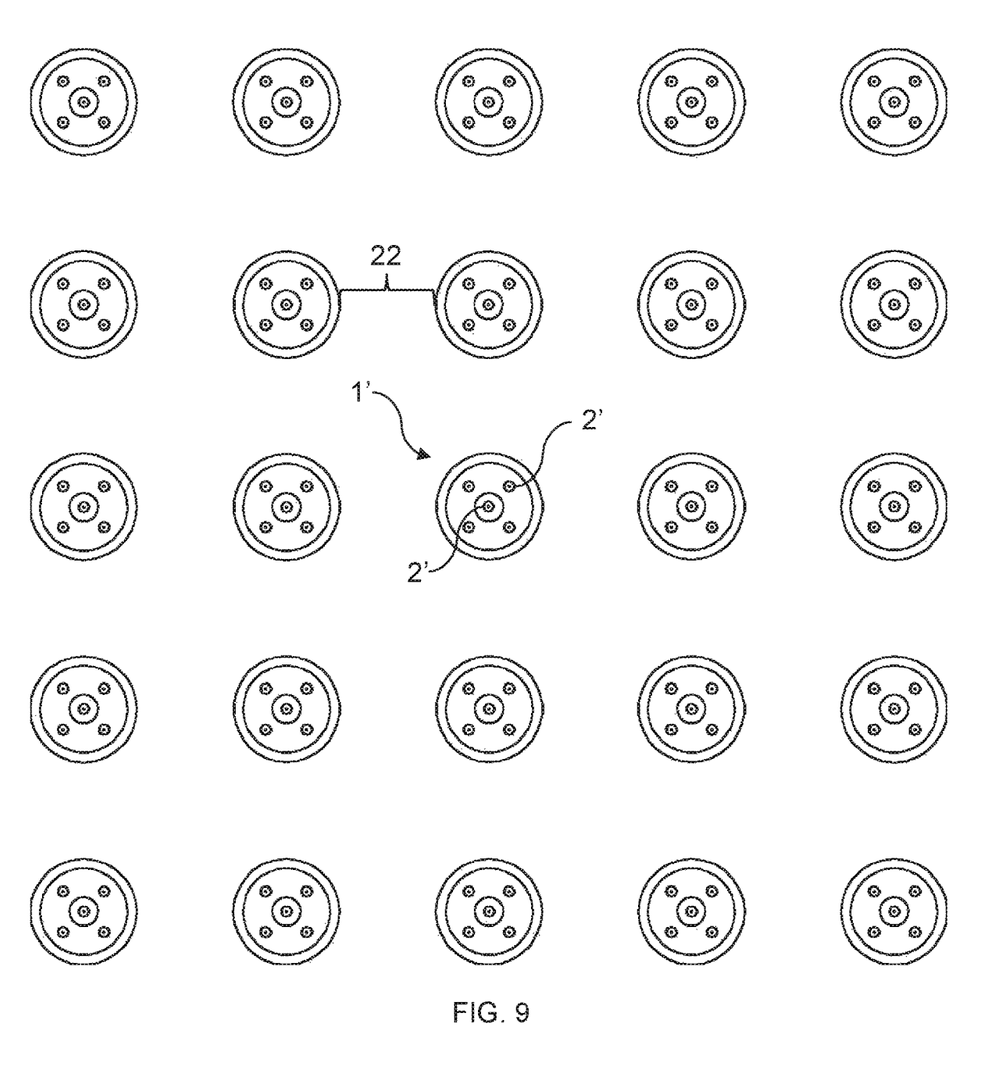
FIG. 9 is a diagram illustrating the front view of the intelligent long-distance infrared fill-light according to second first preferred embodiment of the present disclosure.

The second preferred embodiment of the present disclosure is shown from FIG. 7 to FIG. 9, where some features similar or identical to those of the previous embodiments are omitted here for brevity, and only the different parts are illustrated. In this embodiment, for example, the number of the infrared fill-lights is increased to form a 5 by 5 array with 25 infrared fill-lights in total, each spaced a spacing 22'. As a result, there are 125 coherent infrared light sources 2' that can be independently controlled, which respectively emit the infrared coherent beam 21'. The substantial overlapping area 211' and the non-overlapping area 212' formed herein may further generate a complex illumination gradient on the faraway plane 512' to be illuminated (hereinafter the illuminated-plane 512'). When the infrared image acquisition equipment obtains an image of the illuminated-object 511' in the predetermined target range 51', such as a person standing in front of the illuminated-plane 512' referred to herein as a highly reflective concrete wall, the image data with uneven brightness will be obtained due to the luminance and reflectivity differences between the illuminated-object 511' and the illuminated-plane 512', then the image data can thereby be stored in the storage unit. According to the brightness in the image of the illuminated-object 511' within the image data, the control unit may calculate and respectively adjust the enabling current of the enabling device, thereby respectively control the luminous intensity of the coherent infrared light sources 2', in order to locally strengthen or weaken the substantial overlapping area 211' and/or the non-overlapping area 212' in the predetermined target range 51'.

More particularly, since the substantial overlapping area 211' and the non-overlapping area 212' of the infrared fill-light array (especially the substantial overlapping area 211') form a light field with complex luminance gradient under the overlapping of multiple beams, the control unit may control the luminous intensity of each individual coherent infrared light source 2' to achieve delicate selective illumination. For example, when the illuminated-object 511' partially enters the substantial overlapping area 211' along the illuminated-plane 512', and partially enters the non-overlapping area 212', the control unit may enhance the illumination of, for example the face of the illuminated-object 511', meanwhile suppressing the illumination of the highly reflective illuminated-plane 512', so that the illuminated-object 511' can present a clearer image in the infrared image acquisition equipment. Particularly, if post-production software is applied to assist the infrared image acquisition equipment, it can produce more accurate photos after capturing clear images.

Furthermore, the control unit can extract past image data from the storage unit accordingly, by comparing the image data at different points therein and analyzing the dynamics of the images of the illuminated-object 511', obtain the location of the illuminated-object 511', and the enabling device can thereby be command beforehand to adjust the luminous intensity of the coherent infrared light source 2' correspondingly to the location of the illuminated-object 511'. If each individual intelligent long-distance infrared fill-light in this embodiment is equipped with a rotation device connected to the light box 1' and a focusing device for adjusting the focal length of the optical lens, the control unit can further track and zoom-in on the illuminated-object 511' after detecting the location of the illuminated-object 511', and meanwhile continuously correcting the brightness and increasing the resolution of the infrared image acquisition equipment. Similarly, the intelligent long-distance infrared fill-light set can be used as lidar as long as it cooperates with a sensor that can receive corresponding laser wavelengths, so as to provide long-distance illumination at night for the lidar.

Since the coherent infrared light sources 2 in this embodiment emit infrared light that is invisible to humans and most animals, in addition to protecting the human eyes at a close distance, the present disclosure can also reduce drastic damages to the natural ecology caused by strong light at night. Moreover, due to utilizing infrared light invisible to humans and most animals, the present disclosure can also be used for various applications such as but not limited to, security systems, border searchlights, coastal defense or smuggling monitoring that requires stealth lighting.

The coherent infrared light source 2' herein is not limited to lasers that emit infrared wavelengths, as long as the infrared image acquisition equipment can sense wavelengths including the infrared and a portion of the visible spectrum. That is, for this embodiment, in addition to the coherent infrared light sources 2', some visible light sources are also added, such as replacing the coherent infrared light source 2' that is located in the center of the infrared fill-light and aligned with the optical axis 111', so that a portion of the coherent infrared light sources 2' can emit near-infrared coherent beams that contains a portion of visible light, wherein the two wavelengths can be selectively outputted, to achieve both substantial illumination and increased flexibility of use. For example, once a highly reflective illuminated-object 511' appears in the non-overlapping area 212', e.g. a person among the stowaways is wearing clothing particularly infrared-reflective. Without a special design, the camera will not be able to clearly identify the rest of the stowaways, leading to misjudgment on the number and the locations of the stowaways. Therefore, when a portion of the illuminated-objects 511' is either too bright or too dim, which makes the image difficult to be effectively recognized, the control unit can receive the image data obtained by the infrared image acquisition equipment, calculate the brightness distribution, label the areas that are either saturated or in need of enhancement, and via the enabling device, adjust the luminous intensity and the emitting wavelength of each coherent infrared light source 2' in the infrared fill-light, so as to increase or decrease the luminance of different areas, making the infrared image acquisition equipment more clearly obtain the image of the illuminated-object 511' in the predetermined target range 51'.

Certainly, the intelligent long-distance infrared fill-light set is not limited to passively waiting for the illuminated-object 511' to enter the substantial overlapping area 211' and/or the non-overlapping area 212'. A rotation device connected to the light box 1' can also be included herein, making the control unit electrically connected to the rotation device, so that the control unit can control the rotation device and rotate the light box 1' to track the illuminated-object 511' in addition to controlling the enabling device. The arrangement and placement of the coherent infrared light source 2' is not limited to the position or tilt angle adopted in this embodiment. The optical lens also does not necessarily use the concave lens set in this embodiment, but may depend on the way the coherent infrared light source 2' is arranged and placed, adopt corresponding convex lens sets, composite lens sets, or even multiple lens arrays.

In addition, the focus is not necessarily a fixed point. Each of the infrared fill-lights can also be used in conjunction with a set of focusing devices that adjust the focal length of the optical lens, so that the control unit is electrically connected to the focusing devices. Consequently, the control unit may control the light box 1' to track the illuminated-object 511' and also focus on the illuminated-object 511' via the focusing devices, making the substantial overlapping area 211' and the non-overlapping area 212' more precisely illuminate the illuminated-object 511' locally. As one skilled in the art can easily understand, when the lens set itself is a set of distance-adjustable lens, it can be used to change the shape of the illuminated area, not limited to, inter alia, a circle. On the other hand, the coherent light source also does not have to be continuous light, but can also be pulsed light.

To summarize, compared with a searchlight with uniform light source, the present disclosure can provide farther and more accurate illumination in the absence of other environmental light sources without easily exposing the location of the device itself, and is thus suitable for fields such as surveillance and detection of smuggling or poaching. In addition, the present disclosure intelligently adjusts the brightness of the images of the illuminated-object 511', so that the infrared image acquisition equipment can capture higher-resolution images without harming the human eyes within a close distance, effectively achieving the purposes of the present disclosure. However, the above are only the preferred embodiments of the present disclosure, and are not meant to limit the scope of implementation of the present disclosure. All simple equivalent changes and modifications made in accordance with the scope of the present disclosure, and the content of the specification shall fall within the scope of the present disclosure.

What is claimed is:

1. An intelligent long-distance infrared fill-light set for illuminating a predetermined target range at least 500 meters, wherein the intelligent long-distance infrared fill-light set cooperates with an infrared image acquisition equipment to obtain at least one image of an illuminated-object within the predetermined target range, and the intelligent long-distance infrared fill-light set comprises:
   a plurality of infrared fill-lights, each comprising:
      at least one optical lens, having an optical axis that passes through a focus;
      a plurality of coherent infrared light sources for respectively emitting at least one infrared coherent beam, wherein each of the infrared coherent beam has a main beam angle, making the infrared coherent beam generate a substantial overlapping area and at least one non-overlapping area when illuminating the predetermined target range; and the main beam angle of at least one of the coherent infrared light sources deviates from the optical axis; and
      a plurality of enabling devices, for outputting enabling current in order to respectively enable the coherent infrared light sources that emit the infrared coherent beam; and
   a control unit that receives image data acquired by the infrared image acquisition equipment, for calculating and respectively adjusting the enabling current of the enabling device according to brightness of the image of the illuminated-object in the image data so as to respectively control luminous intensity of the coherent infrared light source, to locally strengthen or weaken the substantial overlapping area and/or the non-overlapping area in the predetermined target range;
   wherein any two infrared fill-lights are spaced at least a predetermined distance, so that within a predetermined dangerous illumination range, human eyes that accidentally enter the predetermined dangerous illumination range will not be simultaneously illuminated by a plurality of infrared coherent beams from the infrared fill-lights, thereby avoiding exceeding the Maximum Permissible Exposure (MPE).

2. The intelligent long-distance infrared fill-light set according to claim 1, wherein at least a portion of illumination wavelengths of part of the infrared coherent beams is within the visible light spectrum, and the infrared image acquisition equipment is a camera that at least senses wavelengths within a sub-infrared spectrum and a portion of the visible light spectrum.

3. The intelligent long-distance infrared fill-light set according to claim 1, further comprises a storage unit, for storing the image data acquired by the infrared image acquisition equipment.

4. The intelligent long-distance infrared fill-light set according to claim 1, wherein the main beam angle of at least one of the coherent infrared light sources is parallel to the optical axis.

5. The intelligent long-distance infrared fill-light set according to claim 1, further comprising a rotation device connected to the infrared fill-light.

6. The intelligent long-distance infrared fill-light set according to claim 1, further comprising a focusing device for adjusting a focal length of the optical lens.

* * * * *